United States Patent
Putnam et al.

(10) Patent No.: US 7,306,406 B2
(45) Date of Patent: Dec. 11, 2007

(54) METHOD OF USING ANIONIC COPOLYMER FORMULATIONS FOR SEEPAGE CONTROL

(75) Inventors: John M. Putnam, Littleton, CO (US); William R. Wernsmann, Chesapeake, VA (US)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 0 days.

(21) Appl. No.: 11/358,471

(22) Filed: Feb. 21, 2006

(65) Prior Publication Data
US 2006/0193700 A1    Aug. 31, 2006

Related U.S. Application Data

(60) Provisional application No. 60/656,179, filed on Feb. 25, 2005.

(51) Int. Cl.
*E02D 3/12*   (2006.01)
*E02B 5/02*   (2006.01)

(52) U.S. Cl. ............... 405/264; 405/36; 405/53; 405/270

(58) Field of Classification Search ........... 405/36, 405/53, 264, 270
See application file for complete search history.

(56) References Cited

U.S. PATENT DOCUMENTS

| | | | | |
|---|---|---|---|---|
| 2,867,944 A * | 1/1959 | Fletcher | ............ | 47/58.1 R |
| 3,520,140 A | 7/1970 | Katzer | ............ | 61/1 |
| 3,772,893 A * | 11/1973 | Eilers | ............ | 405/264 |
| 3,832,229 A | 8/1974 | Du Brow et al. | ............ | 117/161 |
| 3,867,330 A | 2/1975 | Frisque | ............ | 260/29.6 |
| 3,986,365 A | 10/1976 | Hughes | ............ | 61/36 |
| 4,669,920 A | 6/1987 | Dymond | ............ | 405/264 |
| 5,185,024 A * | 2/1993 | Siemer et al. | ............ | 504/361 |
| 5,595,957 A * | 1/1997 | Bowey et al. | ............ | 504/118 |
| 6,397,519 B1 | 6/2002 | Snowden et al. | ............ | 47/9 |
| 6,851,219 B2 * | 2/2005 | Kostka et al. | ............ | 47/59 S |
| 7,026,385 B2 | 4/2006 | Wammes et al. | ............ | 524/446 |
| 2004/0192199 A1 | 9/2004 | Cartwright et al. | ............ | 510/420 |

FOREIGN PATENT DOCUMENTS

| | | |
|---|---|---|
| DE | 1 717 203 | 7/1971 |
| FR | 2 647 463 | 12/1988 |
| RU | 1 218 084 | 3/1986 |
| WO | 2004/085587 | 10/2004 |

OTHER PUBLICATIONS

A.M. Falatah et al in *Arid Soil Research Rehab.*, 1999, 13, pp. 61-73.
R.D. Lentz et al in *J. Soil Water Conservat. (Ankeny)*, 2003, 58(5), pp. 290-300.
A.M. Helalia et al in *Soil Sci. Soc. America J.*, 1988, 52(1), pp. 243-246.
D.L. Bjorneberg et al in *J. Soil Water Conservat. (Ankeny)*, 2002, 57(6), pp. 524-529.
English Language Abstract- AN 1991:166541 of FR 2 647 463.
English, Language abstract No. 1969:58694 of DE 1,717,203.

* cited by examiner

*Primary Examiner*—John Kreck
(74) *Attorney, Agent, or Firm*—Shiela A. Loggins

(57) ABSTRACT

This invention relates to a method of seepage control which comprises contacting a soil surface with a composition comprising anionic copolymers and a surfactant. This invention provides a method of seepage control for irrigation ditches, drainage ditches, farm ponds, feeder canals, golf course water features, park ponds and lakes, lagoons, and the like.

13 Claims, No Drawings

METHOD OF USING ANIONIC COPOLYMER FORMULATIONS FOR SEEPAGE CONTROL

This application claims the benefit of Provisional Application Ser. No. 60/656,179, filed on Feb. 25, 2005 and herein incorporated entirely by reference.

This invention relates to a method of seepage control which comprises contacting a soil surface with a composition comprising anionic copolymers and a surfactant. This invention provides a method of seepage control for irrigation ditches, drainage ditches, farm ponds, feeder canals, golf course water features, park ponds and lakes, lagoons, and the like.

BACKGROUND

Water losses to the earth due to seepage have long been experienced. For example, irrigation ditches, feeder canals and drainage ditches lose great quantities of water to the ground before the water is used or before it reaches its point of application. Also great quantities of water are lost due to seepage in farm ponds.

It is a known fact that water or moisture will penetrate and be absorbed by a permeable surface. More specifically, water tends to penetrate the ground upon contact. This loss of water is experienced to a great extent in arid climates, for example the western and southwestern portions of the United States, where irrigation is a requirement for the growing and maintaining of any vegetable or plant life.

It would be desirable to provide a method of seepage control by which the amount of water lost through a permeable surface, i.e., the earth, could be minimized. Such a method would provide an improved method for transportation of water from both a cost and waste standpoint.

U.S. Pat. No. 3,832,229 discloses a method for seepage control using latex polymer formulations.

U.S. Pat. No. 3,986,365 discloses a method for sealing soil using water-soluble polymers and bentonite.

U.S. Pat. No. 4,669,920 discloses soil sealing compositions and methods comprising copolymers of allylsulfonic acid monomers and blends of acrylic acid and acrylamide.

U.S. Pat. No. 3,520,140 discloses a soil sealing method comprising sodium acrylate and acrylamide with a small amount of a multifunctional cross-linking agent.

US2004/0097601 discloses clay-containing mixtures or blends further comprising partially water-soluble polymers useful as moisture resistant gels.

WO 2004/085587 discloses a polymeric agent useful as a cleaning composition for flocculating soil.

A. M. Falatah et al in *Arid Soil Research Rehab.*, 1999, 13, 61-73 describe inhibition of water infiltration in sandy soils with water-soluble polymers.

R. D. Lentz et al in *J. Soil Water Conservat. (Ankeny)*, 2003, 58(5), 290-300 describes the inhibition of water infiltration with polyacrylamide and surfactants.

French Pat. No. 2,647,463 discloses the use of flocculating polyacrylamide polymers as soil sealants to suppress water leakage.

U.S. Pat. No. 6,397,519 discloses a polymer composition comprising polyacrylamide polymers and calcium compounds useful for soil treatment.

U.S. Pat. No. 3,867,330 discloses brines containing water-soluble anionic vinyl addition polymers and water-soluble cationic polymers useful for secondary recovery of petroleum and seepage control in irrigation ditches and feeder canals.

A. M. Helalia et al in *Soil Sci. Soc. America J.*, 1988, 52(1), 243-246 describe the use of polyacrylamide compositions as soil flocculation aides.

D. L. Bjorneberg et al in *J. Soil Water Conservat. (Ankeny)*, 2002, 57(6), 524-529 describe the use of polyacrylamide compositions for the reduction of irrigation-induced soil erosion.

German Pat. No. 1,717,203 discloses the use of cross-linked polyacrylates to seal the soil underlayer to reduce water seepage.

It is now been discovered that a method may be affected for the control of water seepage into the soil by the application of a novel aqueous soil treatment composition comprising anionic copolymers and a surfactant. This method provides seepage control for irrigation ditches, drainage ditches, farm ponds, feeder canals, golf course water features, park ponds and lakes, lagoons, and the like.

DETAILED DISCLOSURE

This invention involves a method of seepage control in water holding or transport earthen containers which comprises contacting a soil surface with a composition comprising an anionic (co)polymer and a surfactant.

The anionic (co) polymer may be formed from ethylenically unsaturated non-ionic monomer(s) and ethylenically unsaturated anionic monomer(s) or potentially ethylenically unsaturated anionic monomer(s). The monomers form monomer units making up the anionic (co)polymer.

The nonionic monomer or monomers are polymerizable allylic, vinylic compounds and are electrically neutral. Representative nonionic monomers include acrylamide, methacrylamide, N-methyl(meth)acrylamide, N,N-methyl(meth)acrylamide, N-isopropyl(meth)acrylamide, N-(2-hydroxypropyl)(meth)acrylamide, poly(ethylene glycol)(meth)acrylate, poly(ethylene glycol) monomethyl ether mono(meth)acrylate, N-methylolacrylamide, N-vinylformamide, N-vinylacetamide, N-vinyl-N-methylacetamide, fumaramide, N-vinyl-2-pyrrolidone, glycerol mono((meth)acrylate), 2-hydroxyethyl(meth)acrylate, vinyl methylsulfone, vinyl acetate, diacetone acrylamide, diesters of maleic, fumaric, succinic and itaconic acids. Examples of hydrophobic, nonionic monomers include acrylates such as methyl (meth)acrylate, ethyl(meth)acrylate, hexyl(meth) acrylcate, hexyl(meth)acrylate, octyl(meth)acrylate, stearyl (meth)acrylate, stearyl ethoxy(meth)acrylate stearyl ethoxyallylether and mixtures thereof.

Suitable preferred nonionic monomer or monomers are for instance acrylamide, methacrylamide, methylmethacrylate, methyl acrylate, hydroxyethylmethacrylate (HEMA), vinyl acetate, poly(ethylene glycol)(meth)acrylate, poly(ethylene glycol) monomethyl ether mono(meth)acrylate and mixtures thereof.

Especially suitable nonionic monomers include (meth) acrylamide and N alkyl(meth) acrylamide.

The most preferred nonionic monomer of the invention is acrylamide.

The anionic or potentially anionic monomer(s) are derived from alpha ethylenically unsaturated monomers comprising a phosphate or phosphonate group, alpha ethylenically unsaturated monocarboxylic acids, monoalkylesters of alpha ethylenically unsaturated dicarboxylic acids, monoalkylamides of alpha ethylenically unsaturated dicarboxylic acids, alpha ethylenically unsaturated compounds comprising a sulphonic acid group, and salts of alpha ethylenically unsaturated compounds comprising a sulphonic acid group, mixtures or salts thereof.

Representative examples of anionic or potentially anionic monomer(s) include acrylic acid, methacrylic acid, vinyl sulphonic acid, salts of vinyl sulfonic acid, vinylbenzene sulphonic acid, salts of vinylbenzene sulphonic acid, alpha-acrylamidomethylpropanesulphonic acid, salts of alpha-acrylamidomethylpropanesulphonic acid, 2-sulphoethyl methacrylate, salts of 2-sulphoethyl methacrylate, acrylamido-2-methylpropanesulphonic acid (AMPS), salts of acrylamido-2-methylpropanesulphonic acid, maleic acid, fumaric acid, itaconic acid, succinic acid, styrenesulphonate, mixtures and salts thereof.

The most preferred anionic or potentially anionic monomer(s) include 2-acrylamide-2-methylpropanesulphonic acid and salts thereof, acrylic acid and salts thereof, or methacrylic acid and salts thereof being the most preferred.

For example, the non-ionic monomer may be (meth)acrylamide, or N-alkyl(meth)acrylamide and the anionic monomer may be selected from the group consisting of methacrylic acid, itaconic acid, maleic acid, acrylic acid and salts thereof.

Alkyl for the purposes of the invention is a $C_1$-$C_4$ carbon chain, branched or unbranched.

The anionic (co)polymer may be formed from polyacrylamide which has been partially hydrolyzed to give anionic functionality.

The preferred (co) polymers are usually anionic and are generally formed from about 15 to about 95% by weight anionic monomer(s) and about 85 to about 5% by weight non-ionic monomer(s). The non-ionic monomer is usually acrylamide but any other toxicologically acceptable ethylenically unsaturated, water soluble, non-ionic monomer can be used. Preferably the anionic (co)polymer is formed from about 30 to about 95% by weight of anionic monomer(s); most preferably from about 50 to about 95% anionic monomer(s). For example, 60 to about 95 weight percent anionic monomer(s) are envisioned. Even greater than 60 weight percent anionic monomer(s) are suggested for example, 65 percent to about 95 weight percent anionic monomer(s) are efficient in the sealant composition.

Bulk solution polymerization is essentially a gel-type polymerization process that can be used to manufacture polymers. That is, an aqueous solution containing between 20 to 80% by weight total monomer is subject to polymerization such that a stiff, rubbery gel is formed from the initially liquid solution. The gel is then pulverized to form particles about 4 mm in size, followed by drying to remove about 90% of the water present. Finally, the dried particles are crushed to a smaller size to produce a granular powder suitable for sale.

Another method is an inverse suspension polymerization. Inverse emulsions are generally formed by preparing a monomer phase, an oil phase, by emulsifying the two together using surfactant and optionally co-surfactants and mechanical homogenization, followed by mixing and degassing the emulsified mixture. The emulsified monomers are then polymerized within the water phase by the addition of initiators.

The anionic monomer is usually an ethylenically unsaturated carboxylic or sulfonic acid monomer (often as the sodium salt) and most usually is a salt of (meth)acrylate. Especially suitable carboxylic acid monomers include methacrylic, itaconic, maleic and acrylic acid usually present as a water soluble salt. The most preferred anionic monomer is acrylic acid or salt thereof.

Preferred polymers or copolymers are formed by about 15 to about 95% by weight acrylic acid salt with the balance being acrylamide. The most preferred salt of acrylic acid is a sodium salt.

It is also possible that an acrylamide homopolymer be partially hydrolyzed so as to form some weight percent anionic functionality. The resulting anionic (co)polymer containing the same ranges of anionic and non-ionic functionalities referred to above and is also encompassed by the invention.

The polymer should be substantially water-soluble or water dispersible and is preferably substantially linear. The monomers from which it is formed are preferably substantially free of cross-linking agent.

For the purposes of the invention, water-soluble means the anionic (co)polymer forms a clear to the eye solution in water. For example, the (co)polymer may have a solubility of about equal to or greater than 3% by weight. The anionic (co) polymer may form a gel or micro-gel in water with or without slight turbidity. However, the (co)polymer of the invention may have variable solubility in the aqueous composition applied to the soil depending upon the pH, additional additives or other varying factors.

It is preferable that the anionic functionality of the (co)polymer is in the form of a water-soluble salt.

The term salt refers to a monovalent cation and is for example an alkali metal cation or ammonium. For example, the term salt refers to $Na^+$, $K^+$, or ammonium.

The anionic copolymer can be in the form of anhydrous powders, aqueous solutions, oil-in-water emulsions, reverse phase emulsions, or some combination thereof. Any of these polymer forms can be added or mixed with the soil in any conventional way for seepage control.

The anionic copolymer can be milled into the aqueous phase or is otherwise provided as a dispersion in a liquid phase and can be any water-soluble polymer that will provide beneficial results when sprayed onto the soil. Usually it is a synthetic polymer made by polymerization of water-soluble ethylenically unsaturated monomer or monomer blend.

The monomers may be selected from non-ionic and anionic monomers. Intrinsic viscosity (measured by a suspended level viscometer at 25° C. in 1N sodium chloride buffered to pH 7 and at 0.01 polymer wt. %) is usually from about 10 dl/g and about 30 dl/g. Often it is at least 15 dl/g to about 26 dl/g.

The polymer dispersion can be a conventional reverse phase emulsion of the relevant polymer, namely a reverse phase emulsion of aqueous polymer particles dispersed (often below 10 micrometer in size, especially in the range of 0.5 to 3.0 micrometers) in a non-aqueous liquid. Typically this emulsion contains 20 to 40% polymer (dry weight) and 20 to 40% by weight of the non-aqueous liquid. This non-aqueous liquid can be a hydrocarbon or other hydrophobic liquid. Preferably, however, the dispersion is a reverse phase emulsion of substantially anhydrous particles of polymer dispersed in the non-aqueous liquid. Such dispersions typically contain 35 to 65% by weight polymer and 35 to 65% by weight non-aqueous liquid and 0 to 15%, often 0 to 10%, by weight water.

Irrespective of whether the dispersion is anhydrous or aqueous, those dispersions in non-aqueous liquid may include an oil-in-water emulsifier in order to promote the emulsification into the irrigation water of the oil phase, so as to facilitate dissolution of the polymer particles into the water.

The molecular weight of the anionic copolymers of the instant invention may vary over a wide range, e.g. from about 10,000 to about 25 million daltons. Another embodiment of the invention is an anionic copolymer with a molecular weight in excess of about one million, for example from about one million to about 25 million Daltons. Another embodiment of the invention is an anionic copolymer with a molecular weight from about five million to about 20 million daltons. Still another embodiment of the instant invention is an anionic copolymer with a molecular weight from about eight million to about 17 million daltons.

The amount of anionic copolymers included in the method is in an amount such that when the anionic copolymers are diluted for use, the copolymers provide adequate copolymer concentration on the soil to give acceptable seepage control. Copolymer concentration in the aqueous treatment of the invention is generally from 0.001 to 10% by weight based on the total weight of the aqueous treatment. Often it is not more than 7% by weight, and more particularly the soil treatment composition is 0.001 to 2% by weight anionic copolymer.

The soil surfaces are, for example, irrigation ditches, drainage ditches, farm ponds, golf course water features, park ponds and lakes, lagoons, and feeder canals.

The surfactants are hydrophilic and are further characterized as being water-soluble.

Any hydrophilic type surfactant such as ethoxylated nonyl phenols, ethoxylated nonyl phenol formaldehyde resin, dioctylesters of sodium sulfosuccinnate, and octyl phenol polyethoxyethanol can be used.

Preferably the surfactants used in the invention are anionic or nonionic. Most preferably the surfactant is anionic.

Other surfactants that may be employed in the soil treatment composition include the soaps such as sodium and potassium myristate, laurate, palmitate, oleate, stearate, resinate, and hydroabietate, the alkali metal alkyl or alkylene sulfates, such as sodium lauryl sulfate, potassium stearyl sulfate, the alkali metal alkyl or alkylene sulfonates, such as sodium lauryl sulfonate, potassium stearyl sulfonate, and sodium cetyl sulfonate, sulfonated mineral oil, as well as the ammonium salts thereof; and salts of higher means like lauryl amine hydrochloride, and stearylamine hydrobromide.

Any anionic or nonionic compound can be used as the surfactant. Examples of suitable anionic surfactants are alkali metal, ammonium and amine soaps; the fatty acid part of such soaps contains preferably at least 16 carbon atoms because soaps based on lauric and myristic acids have a great tendency to develop abundant foam.

Other examples of suitable anionic surfactants are alkali metal salts of alkyl-aryl sulfonic acids, sodium dialkyl sulfosuccinnate, sulfated or sulfonated oils; for example, sulfated castor oil, sulfonated tallow, and alkali salts of short chain petroleum sulfonic acids.

Examples of suitable nonionic surfactants are condensation products of higher fatty alcohols with ethylene oxide, such as the reaction product of oleoyl alcohol with 10 ethylene oxide units; condensation products of alkylphenols and ethylene oxide, such as the reaction products of isooctylphenol with 12 ethylene oxide units; condensation products of higher fatty acid amides with five, or more ethylene oxide units; polyethylene glycol esters of long chain fatty acids, such as tetraethylene glycol monopalmitate, hexaethyleneglycol monolaurate, nonaethylene glycol monostearate, nonaethylene glycol dioleate, tridecaethyleneglycol monoarachidate, tricosaethylene glycol monobehenate, tricosaethylene glycol dibehenate, polyhydric alcohol partial higher fatty acid esters such as sorbitan tristearate, ethylene oxide condensation products of polyhydric alcohol partial higher fatty acid esters, and their inner anhydrides (mannitolanhydride, called Mannitan, and sorbitol-anhydride, called Sorbitan), such as the emulsion even reacted with 10 molecules of ethylene oxide, pentaerythritolmonooleate reacted with 12 molecules of ethylene oxide, sorbitan monostearate reacted with 10 to 15 molecules of ethylene oxide; long chain polyglycols in which one hydroxyl group is etherified with a higher fatty acid and the other hydroxyl group is etherified with a low molecular weight alcohol, such as methoxypolyethylene glycol 550 monostearate (550 meaning the average molecular weight of the polyglycol ether). A combination of two or more of these surfactants may be used; e.g. a cationic may be blended with a nonionic or an anionic with a nonionic.

Following is a list of suitable surfactants that could be used in the practice of this invention. Any water-soluble surfactant could be used, but naturally some are more efficient than others. Useful surfactants include, but are not limited to: polyoxyethylene (10 mole) cetyl ether, polyoxyethylene alkyl-aryl ether, polyoxyethylene monolaurate, polyoxyethylene vegetable oil, polyoxyethylene sorbitan monolaurate, polyoxyethylene esters or mixed fatty and resin acids, polyoxyethylene sorbitan monostearate, polyoxyethylene sorbitan monooleate, polyoxyethylene monostearate, polyoxyethylene (20 mole) stearyl ether, polyoxyethylene (20 mole) oleyl ether, polyoxyethylene (15 mole) tridecyl ether, polyoxyethylene fatty alcohol, polyoxyethylene alkyl amine, polyoxyethylene glycol monopalmitate, polyoxyethylene sorbitan monopalmitate, polyoxyethylene (20 mole) cetyl ether, polyoxyethylene oxypropylene stearate, polyoxyethylene lauryl ether, polyoxyethylene lanolin derivative, sodium oleate, quaternary ammonium derivative, potassium oleate, N-cetyl N-ethyl morpholinium ethosulfate, and pure sodium lauryl sulfate.

It is preferably that the surfactant is anionic. The anionic surfactant is preferably selected from the group consisting of alkali metal salts of alkyl-aryl sulfonic acids, dialkyl sulfosuccinnate, sulfated or sulfonated oils, sulfated castor oil, sulfonated tallow, short chain petroleum sulfonic acids, myristate, laurate, palmitate, oleate, stearate, resinate, hydroabietate, alkylene sulfates, lauryl sulfate, stearyl sulfate, alkyl or alkylene sulfonates, lauryl sulfonate, stearyl sulfonate, cetyl sulfonate and sulfonated mineral oil.

In addition to using the water soluble surfactants described above, other surfactants may be used such as silicones, clays and the like which are included as surfactants since, in certain instances, they tend to invert the emulsion even though they are not water soluble.

The water seepage control composition may be applied by any methods known in the art such as spraying, coating or rolling the composition onto the earthen container's soil surface before water is added to the earthen container. The soil surface may be dry or wet before topical application of the inventive composition.

While not wishing to be bound by theory, it is believed that the combination of the anionic (co) polymer with the surfactant allows for more efficient wetting of the top layer of soil surface and formation of a more effective barrier to water losses through the soil.

The surfactant when combined with the anionic copolymer can be topically applied to the soil. The coverage rate is about 1 pound per acre to about 250 pounds per acre. The coverage is, for example, about 10 pounds per acre to about 100 pounds per acre. For example, the coverage rate is about 10 pounds per acre to about 50 pounds per acre.

In addition, the surfactant can be topically applied separately to the soil. The coverage rate is about 0.01 pound per acre to about 100 pounds per acre. The coverage is, for example, about 0.1 pound per acre to about 10 pounds per acre. For example, the coverage rate is about 1 pound per acre to about 4 pounds per acre.

In addition, the anionic copolymer can be topically applied separately to the soil. The coverage rate is about 1 pound per acre to about 500 pounds per acre. The coverage is, for example, about 10 pounds per acre to about 100 pounds per acre. For example, the coverage rate is about 10 pounds per acre to about 50 pounds per acre.

After topical application of the anionic (co)polymer and surfactant, the water filled pond, irrigation ditch etc. may be spot treated with polyacryamides or anionic polyacrylamides to improve and maintain sealing properties. The spot treatment may consist of releasing the polyacrylamide or anionic polyacrylamide by metering into the water flow or via slow dissolution of "bricks" of polyacrylamide or anionic polyacrylamide into the water reservoir. Typical polyacrylamides used in the spot treatment are commercially sold under the tradename SOILFIX by Ciba Specialty Chemicals Corp.

The surfactant should be used in an effective amount in relation to the anionic (co)polymer. An effective amount for the purposes of the invention means in an amount which effectively improves the water seepage control. For example, the ratio of the anionic copolymer to surfactant used in the instant method may vary from about 1:100 to about 100:1 on a weight basis. For instance, the anionic copolymer to surfactant weight to weight ratio is from about 1:50 to about 50:1. For example, the anionic copolymer to surfactant ratio is from about 1:20 to about 20:1 on a weight basis. Preferably, the weight ratio of polymer to surfactant ranges from 2:1 through 25:1 and most preferably 5:1 through 25:1. For example, 7.5:1 through 25:1 is envisioned.

Another embodiment of the instant invention is a water seepage control composition comprising:

a) an anionic (co)polymer, wherein the anionic (co)polymer is formed from 15 to 95% by weight of a water soluble salt of acrylic acid and from 85 to 5% of acrylamide by weight based on the total weight of the anionic (co)polymer. and b) a surfactant.

The anionic copolymer in a) included in the water seepage control composition is in an amount such that when the anionic copolymer is diluted for use in water provides adequate anionic copolymer concentration on the soil to give acceptable water seepage control. Anionic copolymer concentration in the water seepage control composition of the invention is generally from 0.0001 to 10% by weight, in particular at least 0.001 or at least 0.5% by weight. Often it is not more than 7% by weight, and more particularly it is about 0.001 to about 2% by weight of anionic copolymer.

The anionic (co)polymer and surfactants of the instant composition are defined as above.

The surfactant in b) included in the water seepage control composition is in an amount such that when used in combination with the anionic copolymer and is diluted for use, it provides adequate concentration on the soil to give acceptable water seepage control. Surfactant concentration in the water seepage control aqueous composition of the invention is generally from about 0.00005 to about 10% by weight of the water solution. Often it is not more than about 7% by weight, and more particularly it is 0.0002 to 2% by weight of the water solution.

The concentration of water in the water seepage control composition of the instant invention is from about 1% to about 99.999% by weight.

EXAMPLE 1

Soil Testing

Polyvinyl chloride (PVC) pipes that are 6 inches in height and 4 inches in diameter are obtained. At the bottom end of each pipe, a paper filter is attached. Each pipe is set up vertically, with the paper end on the bottom, and is filled with the same representative soil type to within one inch of the top of the pipe. The test compounds are dissolved in water and applied to the soil surface at the concentration shown below. Enough water, containing no test compounds, is then added to bring the level to the top of the pipe. The leakage rate is determined by the amount of time required to dissipate one inch of water.

| Compound | Dosage Rate (pounds/acre) | Time (minutes) |
| --- | --- | --- |
| None | 0 | 30 |
| Comparative 1 | 10 | 100 |
| Comparative 1 | 50 | 280 |
| Compound 1 | 20 | 460 |
| Compound 2 | 20 | 500 |

Comparative 1 is an acrylamide/sodium acrylate, 15% sodium acrylate, linear, intrinsic viscosity equals 17 dl/g, molecular weight equals 8-10 million.

Compound 1 is acrylamide/sodium acrylate copolymer, 88% by weight sodium acrylate, linear, intrinsic viscosity equals 22 dl/g, molecular weight equals 10-13 million.

Compound 2 is acrylamide/sodium acrylate copolymer, 70% by weight sodium acrylate, linear, intrinsic viscosity equals 26 dl/g, molecular weight equals 12-15 million.

The compounds 1 and 2 are quite efficacious at reducing water seepage.

EXAMPLE 2

Canal Simulation Tests

A hundred-twenty foot trough is constructed to simulate an irrigation canal. Soil is added to the trough and spread so that the walls are at an incline of 30 to 45 degrees.

Compositions comprising compound 1 with sodium dioctylsulfosuccinate and compositions comprising compound 2 with sodium dioctylsulfosuccinate are each dissolved in water and sprayed on the earthen walls of the trough at a dosage rate of 50 pounds per acre. Water is now run through the trough at fifteen gallons per minute and the leak rate is checked. The composition of compound 1 with surfactant and composition of compound 2 with surfactant both provide very low water seepage rates.

EXAMPLE 3

Simulated Pond Tests

A forty-eight inch, in diameter, cylindrical open top tank with a bottom drain is obtained. Twelve inches of gravel are added to the tank and distributed evenly across the bottom.

A porous screen then covers the gravel layer. Twelve inches of test soil are added on top of the screen and distributed evenly. Compounds 1 and 2 are dissolved in water with sodium dioctylsulfosuccinate as in example 2 and applied to the soil at a rate of twenty pounds per acre. Water is then added on top of the soil and the leakage is monitored by the amount of water collected from the bottom drain. Both compositions of anionic copolymers with surfactant are shown to be quite efficacious at reducing water seepage from ponds.

EXAMPLE 4

Soil Testing

Polyvinyl chloride (PVC) pipes that are 6 inches in height and 2 inches in diameter are obtained. At the bottom end of each pipe, a paper filter is attached. Each pipe is set up vertically, with the paper end on the bottom, and is filled with the same silty soil type to within one inch of the top of the pipe. The test compounds (compounds 2 and 3) are dissolved in water and applied to the soil surface at the concentration shown below. One teaspoon of this water solution is the amount added to the soil surface. Enough water, containing no test compounds, is then added to bring the level to the top of the pipe. The leakage rate is determined by the amount of time required to dissipate one inch of water.

| Compound | Dosage Rate (pounds/750 gallons water) | Time (hours) |
| --- | --- | --- |
| Compound 2 | 5.65 | 20 |
| Compound 3 | 8.00 | |

Compound 2 is acrylamide/sodium acrylate copolymer, 70% by weight sodium acrylate, linear, intrinsic viscosity equals 26 dl/g, molecular weight equals 12-15 million.

Compound 3 is sodium dioctylsulfosuccinate.

The combination of the instant copolymer and a surfactant is quite efficacious at the control of water seepage.

EXAMPLE 5

Irrigation Canal Testing

An empty irrigation canal in the western United States, measuring 20 feet wide and 1.45 miles long, is cleaned to remove vegetation from the canal surface with a backhoe type tractor. Compound 2 (7.5 pounds) and Compound 3 (8 ounces) are dissolved in a 400-gallon tank of water. After mixing for 45 minutes, the solution is applied to the canal walls with a hydromulch applicator. The 400 gallons of water solution is then applied to approximately 300-350 linear feet of the canal. The entire canal is topically treated. Two monitoring wells are installed beneath the canal surface: one at the beginning and the other at the opposite end. The wells monitor the water seepage through the canal surface. Water is now introduced into the canal and the water seepage is monitored over the summer season.

| Compound | Water Seepage Reduction Rate (cubic feet per second per 1.45 mile) |
| --- | --- |
| None | 0.0 |
| Compound 2 Compound 3 | 5.5 |

Compound 2 is acrylamide/sodium acrylate copolymer, 70% by weight sodium acrylate, linear, intrinsic viscosity equals 26 dl/g, molecular weight equals 12-15 million.

Compound 3 is sodium dioctylsulfosuccinate.

The combination of the instant copolymer and a surfactant is quite efficacious at the control of water seepage in an irrigation ditch.

EXAMPLE 6

Soil Testing

Polyvinyl chloride (PVC) pipes that are 8.5 inches in height and 3 inches in diameter are obtained. At the bottom end of each pipe, a paper filter is attached. Each pipe is set up vertically, with the paper end on the bottom, and is filled with the same mixture of clay and silt to within one inch of the top of the pipe. The test compounds (compound 2 and compound 3) are dissolved in water and applied to the soil surface. The polymer concentration in the water is 1,000 mg/L and surfactant concentration is 160 mg/L. One teaspoon of this water solution is the amount added to the soil surface. Enough water, containing no test compounds, is then added to bring the level to the top of the pipe. The leakage rate is determined by the amount of time required to dissipate one inch of water.

Compound 2 is acrylamide/sodium acrylate copolymer, 70% by weight sodium acrylate, linear, intrinsic viscosity equals 26 dl/g, molecular weight equals 12-15 million.

Compound 3 is sodium dioctylsulfosuccinate.

The combination of the instant copolymer and a surfactant is quite efficacious at control water seepage.

What is claimed is:

1. A method of seepage control in water holding or transport earthen containers which comprises contacting a soil surface with a composition comprising
    an anionic (co)polymer and a surfactant,
    wherein the anionic (co)polymer is a (co)polymer formed from 50 to 95 wt. % an ethylenically unsaturated anionic monomer(s) which anionic monomer(s) is selected from the group consisting of methacrylic acid, itaconic acid, maleic acid, acrylic acid and salts thereof, the molecular weight of the anionic (co)polymer is from about 8 million to about 20 million Daltons and the wt. % is based on total weight of the anionic (co)polymer.

2. The method according to claim 1 wherein the composition is topically applied to the earthen container surface before the earthen container is filled with water or before water is transported through the earthen container.

3. The method according to claim 1 wherein the surfactant is anionic.

4. The method according to claim 3 wherein the anionic surfactant is selected from the group consisting of alkali metal salts of alkyl-aryl sulfonic acids, dialkyl sulfosuccinnate, sulfated or sulfonated oils, sulfated castor oil, sulfonated tallow, short chain petroleum sulfonic acids, myristate, laurate, palmitate, oleate, stearate, resinate, hydroabietate, alkylene sulfates, lauryl sulfate, stearyl sulfate, alkyl or alkylene sulfonates, lauryl sulfonate, stearyl sulfonate, cetyl sulfonate and sulfonated mineral oil.

5. The method according to claim 1 wherein the anionic (co)polymer is a (co)polymer formed from ethylenically unsaturated non-ionic monomer(s) and ethylenically unsaturated anionic monomer(s).

6. The method according to claim 1 wherein the anionic (co)polymer is polyacrylamide which has been partially hydrolyzed to give anionic functionality.

7. The method according to claim 5 wherein the non-ionic monomer is selected from the group consisting of (meth) acrylamide, or N-alkyl(meth)acrylamide.

8. The method according to claim 1 wherein the surfactant is selected from the group consisting of ethoxylated nonyl phenols, ethoxylated nonyl phenol formaldehyde resin, dioctylesters of sodium sulfosuccinnate, and octyl phenol polyethoxyethanol.

9. The method of seepage control according to claim 2 wherein the water held by or transported through the earthen container is further treated with polyacrylamide or anionic polyacrylamide.

10. The method according to claim 1 wherein the soil surfaces are irrigation ditches, drainage ditches, farm ponds, feeder canals, golf course water features, park ponds lakes, or lagoons.

11. The method according to claim 1 wherein the weight to weight ratio of anionic (co)polymer to surfactant is from about 1:100 to about 100:1.

12. The method according to claim 11 wherein the weight to weight ratio of anionic (co)polymer to surfactant is from about 1:50 to about 50:1.

13. The method according to claim 12 wherein the weight to weight ratio of anionic (co)polymer to surfactant is from about 1:20 to about 20:1.

* * * * *